United States Patent
Tamai et al.

(10) Patent No.: US 7,528,578 B2
(45) Date of Patent: May 5, 2009

(54) POWER SUPPLY APPARATUS

(75) Inventors: Mikitaka Tamai, Tsuna-gun (JP); Hiroyoshi Yamamoto, Sumoto (JP); Masao Yamaguchi, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 353 days.

(21) Appl. No.: 11/020,032

(22) Filed: Dec. 23, 2004

(65) Prior Publication Data

US 2005/0140334 A1    Jun. 30, 2005

(30) Foreign Application Priority Data

Dec. 26, 2003    (JP)    ............................. 2003-434255

(51) Int. Cl.
    *H02J 7/00*    (2006.01)
(52) U.S. Cl. .................. 320/134; 320/118; 320/124; 320/125
(58) Field of Classification Search .................. 320/134, 320/118, 1, 25, 124, 34
    See application file for complete search history.

(56) References Cited

U.S. PATENT DOCUMENTS

| 5,644,209 | A |   | 7/1997  | Chabbert et al. |         |
|-----------|---|---|---------|-----------------|---------|
| 5,677,613 | A |   | 10/1997 | Perelle         |         |
| 6,025,695 | A | * | 2/2000  | Friel et al.    | 320/106 |
| 6,177,779 | B1| * | 1/2001  | Eguchi          | 320/116 |
| 6,866,107 | B2| * | 3/2005  | Heinzmann et al.| 180/7.1 |

FOREIGN PATENT DOCUMENTS

| EP | 0 498 679   | 2/1992  |
|----|-------------|---------|
| JP | 9-312172    | 12/1997 |
| JP | 11-164488   | 6/1999  |
| JP | 2001-57743  | 2/2001  |
| JP | 2001-333542 | 11/2001 |
| JP | 2002-17052  | 1/2002  |
| JP | 2003-111295 | 4/2003  |
| WO | 01/59905    | 8/2001  |

* cited by examiner

*Primary Examiner*—Adolf Berhane
*Assistant Examiner*—Yalkew Fantu
(74) *Attorney, Agent, or Firm*—Wenderoth, Lind & Ponack, L.L.P

(57) ABSTRACT

A battery pack including a discharge current interruption FET which cuts off the discharge current, and a minimum voltage detecting portion which switches the discharge current interruption FET from ON to OFF state when the voltage of any battery becomes lower than a minimum voltage. The charge circuit includes a charge current switching portion which switches the charge current so as to charge the battery pack in a main charge mode when the output voltage is higher than a prescribed voltage, and in a preliminary charge mode with a small current when the output voltage is lower than the prescribed voltage. A charge current switching portion charges the battery pack in the preliminary charge mode in the state where the OFF signal of the discharge current interruption FET is provided, even in the state where the output voltage of the battery pack is higher than the prescribed voltage.

14 Claims, 3 Drawing Sheets

POWER SUPPLY APPARATUS

BACKGROUND OF THE INVENTION

1. Technical Field

The present invention relates to a power supply apparatus having a battery pack with a plurality of rechargeable batteries connected in series, and a charge circuit which charges the battery pack.

2. Description of Related Art

FIG. 1 shows a circuit diagram of a battery pack 21 having a plurality of batteries 23 connected in series. The battery pack 21 has an overdischarge protection circuit 26 which prevents overdischarge of each battery 23. The overdischarge protection circuit 26 detects the voltage of each battery 23. When the voltage of any battery 23 becomes lower than a minimum voltage, the overdischarge protection circuit 26 turns a discharge current interruption FET 24 to OFF state. The discharge current interruption FET 24 turned to OFF state cuts off the discharge current, stopping discharge. The battery pack 21 is connected to a charger 22, and is charged. A charge current passes through a intrinsic diode 25, (in other ways, the diode 25 is called a parasitic diode 25) of the discharge current interruption FET 24, and flows into the batteries 23.

Since the discharge current interruption FET 24 is an equivalent circuit in which the parasitic diode 25 is connected in the reverse direction in parallel, it can cut off a current in the forward direction. However, the discharge interruption FET 24 cannot cut off a current in the reverse direction. Accordingly, the discharge current interruption FET 24 can pass the charge current in OFF state, where discharge is prohibited, so the battery pack 21 can be charged.

However, the parasitic diode has the disadvantage of large electric power loss as compared with the case where a current flows through the FET in ON state in the forward direction. A relatively large voltage drop occurs in the parasitic diode in the case where a current flows in the forward direction. Additionally, electric power loss in the parasitic diode increases in proportion to the product of a voltage drop and a current. Since the voltage drop in the parasitic diode is large as compared with the discharge current interruption FET in ON state, electric power loss in the parasitic diode is also large. Accordingly, in the case where the battery pack is charged by passing the charge current through the FET in OFF state via the parasitic diode, the amount of heat generation of the FET is very large. As a result, adverse effects arise, such as a thermal breakdown or deterioration of the discharge current interruption FET due to the charge current when the battery pack is charged.

A charger, which detects the output voltage of a battery pack before charging it and controls the charge current with the amplitude of output voltage, has been developed. This charger charges the battery pack whose output voltage is lower than a prescribed voltage with a small current in a preliminary charge mode, not in a quick charge mode. The charger switches to the quick charge mode when its output voltage becomes higher than the prescribed voltage due to preliminary charging and charges the battery pack with a large current. The charger does not charge a battery pack whose output voltage is low and which may be in trouble with a large current in the quick charge mode. Thus, the charger can safely charge a battery pack.

However, as shown in FIG. 1, in the case where this type of charger charges the battery pack 21 which switches ON/OFF of the discharge current interruption FET 24 based on the voltage of each battery. The charger may start charging the battery pack 21 in the quick charge mode in the state where the discharge current interruption FET 24 is OFF state. Generally, the voltage is set so that the charger switches to the quick charge mode after the FET turns to ON state sufficiently. But, when cell balance is lost, problems arise. For example, a battery pack is charged in the quick charge mode from the start when the battery pack, whose output voltage is higher than a prescribed voltage to start quick charging though the voltage of any battery, becomes lower than a minimum voltage, and the discharge current interruption FET is in OFF state. In the case of the battery pack in which the voltage of any battery become lower than the minimum voltage, a possibility that the output voltage becomes lower than the prescribed voltage increases. However, as the number of the rechargeable batteries connected in series increases, the voltage of one battery less affects the output voltage of the battery pack. For this reason, even if the voltage of any one battery becomes lower than the minimum voltage, the output voltage of the whole battery pack may be higher than the prescribed voltage to start quick charging. When the battery pack in this state is charged in the quick charge mode, the charge current flows through the parasitic diode in the discharge current interruption FET in OFF state. When a large current for quick charging flows through the parasitic diode, the amount of heat generated in the discharge current interruption FET should be large, which causes thermal runaway and breakdown.

In order to solve the deficiencies noted above, a device has been developed that turns a discharge current interruption FET in OFF state to an ON state for quick charging.

(e.g., Japanese Patent Laid-Open Publication TOKUKAI No. 2001-57743, hereafter "Tokukai")

When charging the battery pack in which the discharge current interruption FET is in OFF state, the device disclosed in Tokukai turns the discharge current interruption FET from OFF state to ON state and charges it in the quick charge mode. Current is applied to the battery pack charged in the quick charge mode in this state and not through the parasitic diode. Thus, heat generation by the parasitic diode can be eliminated. The reason is that, the discharge current interruption FET in ON state is connected to the parasitic diode in parallel. Thus, the voltage drop is very small as compared with the parasitic diode. This can reduce power consumption.

However, this device forcedly turns the discharge current interruption FET in OFF state to ON state, and charges the battery pack with a large current in the quick charge mode. Accordingly, although the device can prevent heat generation of FET, it cannot safely charge all of battery packs. The reason is that a battery pack in which the voltage of any battery becomes lower than the minimum voltage is charged with a large current in the quick charge mode. The battery whose battery voltage is lower than the minimum voltage is an abnormal battery or a battery which deeply discharges. In the case where the battery is not an abnormal battery but a battery which deeply discharges, when the battery is charged with a small current in the preliminary charge mode, its battery voltage becomes higher than the minimum voltage. In the case of an abnormal battery even if the battery is charged in the preliminary charge mode, its battery voltage does not rise high from the minimum voltage. Accordingly, it is preferable to charge a battery pack in which the voltage of any battery becomes lower than the minimum voltage in the quick charge mode after it is confirmed that the voltages of all batteries become higher than the minimum voltage. In other words, after it is confirmed that the battery pack is not abnormal. In this case, it is preferable to initially charge the battery pack with a small current in the preliminary charge mode. On the contrary, a device, that forcedly turns the discharge current interruption FET from OFF state to ON state to charge a battery pack in the quick charge mode, charges even a battery pack containing an abnormal battery, which cannot be safely charged.

SUMMARY OF THE INVENTION

The present invention has been developed for solving the disadvantage. An object of the present invention is to provide a power supply apparatus having a battery pack and a charge circuit capable of safely charging a battery pack containing an abnormal battery or a battery whose battery voltage is low as compared with other battery. Additionally, the present invention effectively prevents breakdown of FET due to heat generation of parasitic diode.

The above and further objects and features of the invention will more fully be apparent from the following detailed description with accompanying drawings.

A power supply apparatus according to the present invention comprises a battery pack including a plurality of rechargeable batteries connected in series, and a charge circuit charging the battery pack. The battery pack includes a discharge current interruption FET which is connected to the rechargeable batteries in series and cuts off the discharge current. A minimum voltage detecting portion compares the voltage of each battery with a minimum voltage, and switches the discharge current interruption FET from ON state to OFF state to cut off the discharge current when the voltage of any battery becomes lower than the minimum voltage. The charge circuit includes a charge current switching portion which detects the output voltage of the battery pack, and switches the charge current so as to charge the battery pack in a main charge mode when the output voltage is higher than a prescribed voltage. The charge circuit charges the battery pack in a preliminary charge mode with a current smaller than that in the main charge mode when the output voltage is lower than the prescribed voltage. The battery pack and the charge circuit are connected with a signal line which transmits an OFF signal representing OFF state of the discharge current interruption FET to the charge current switching portion. The charge current switching portion charges the battery pack in the preliminary charge mode in the state where the OFF signal is provided from the signal line, even in the state where the output voltage of the battery pack is higher than the prescribed voltage.

The aforementioned power supply apparatus safely charges a battery pack containing an abnormal battery or a battery whose battery voltage is low as compared with another battery, and can effectively prevent breakdown of FET due to heat generation of parasitic diode. The charge current switching portion of the charge circuit detects the output voltage of the battery pack, and switches the charge current so as to charge the battery pack in the main charge mode when the output voltage is higher than the prescribed voltage. The battery pack is charged in the preliminary charge mode with a current smaller than that in the main charge mode when the output voltage is lower than the prescribed voltage. The charge current switching portion charges the battery pack in the preliminary charge mode in the state where the voltage of any battery in the battery pack becomes lower than the minimum voltage; even if in the state where the output voltage of the battery pack is higher than the prescribed voltage. The power supply apparatus of the present invention charges the battery pack not in the main charge mode but in the preliminary charge mode with a current smaller than that in the main charge mode in the state where the voltage of any battery becomes lower than the minimum voltage (e.g., in the state where the discharge current interruption FET is in OFF state) even if the output voltage of the battery pack is higher than the prescribed voltage. Accordingly, a large charge current flowing through the discharge current interruption FET in OFF state is prevented. Thus, thermal breakdown of the discharge current interruption FET in the main charge mode is prevented.

Furthermore, when the discharge current interruption FET is in OFF state, the power supply apparatus of the present invention does not switch the discharge current interruption FET from OFF state to ON state to charge the battery pack with a large charge current in the main charge mode (e.g., similar to a conventional battery pack.) Instead, the power supply apparatus of the present invention charges the battery pack with a current smaller than that in the main charge mode in the preliminary charge mode. Accordingly, it is possible to charge a battery pack in which the voltage of any battery becomes lower than the minimum voltage after it is confirmed that the voltages of all batteries become higher than the minimum voltage (e.g., after it is confirmed that the battery pack is not abnormal) by initially charging the battery pack with a small current in the preliminary charge mode. Therefore, the aforementioned power supply apparatus of the present invention safely charges a battery pack without initially charging a battery pack containing an abnormal battery with a large current.

DETAILED DESCRIPTION OF THE PREFERRED EMBODIMENTS

Figure 1:
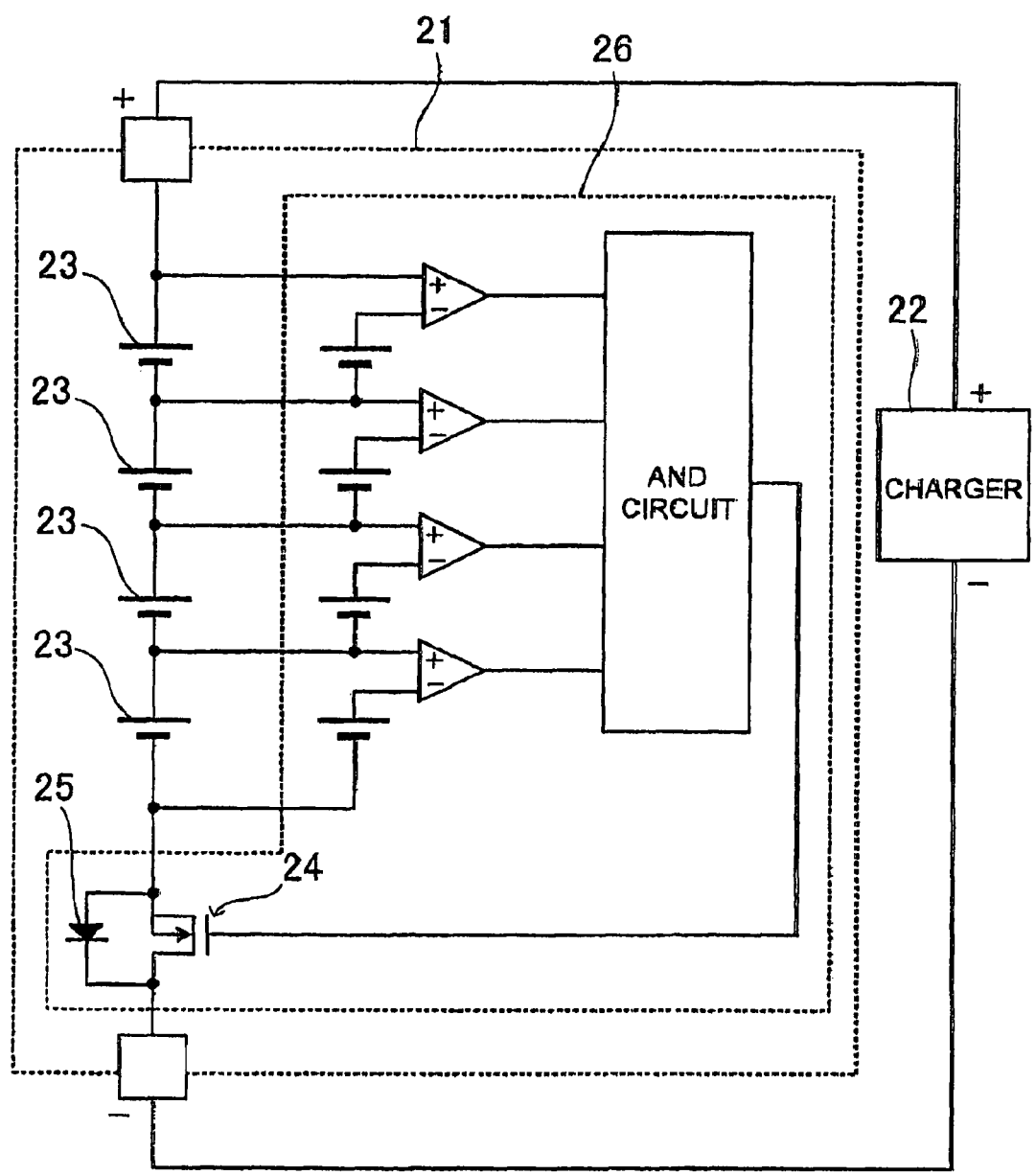
FIG. 1 is a circuit diagram of a conventional battery pack having a plurality of batteries therein.
Figure 2:
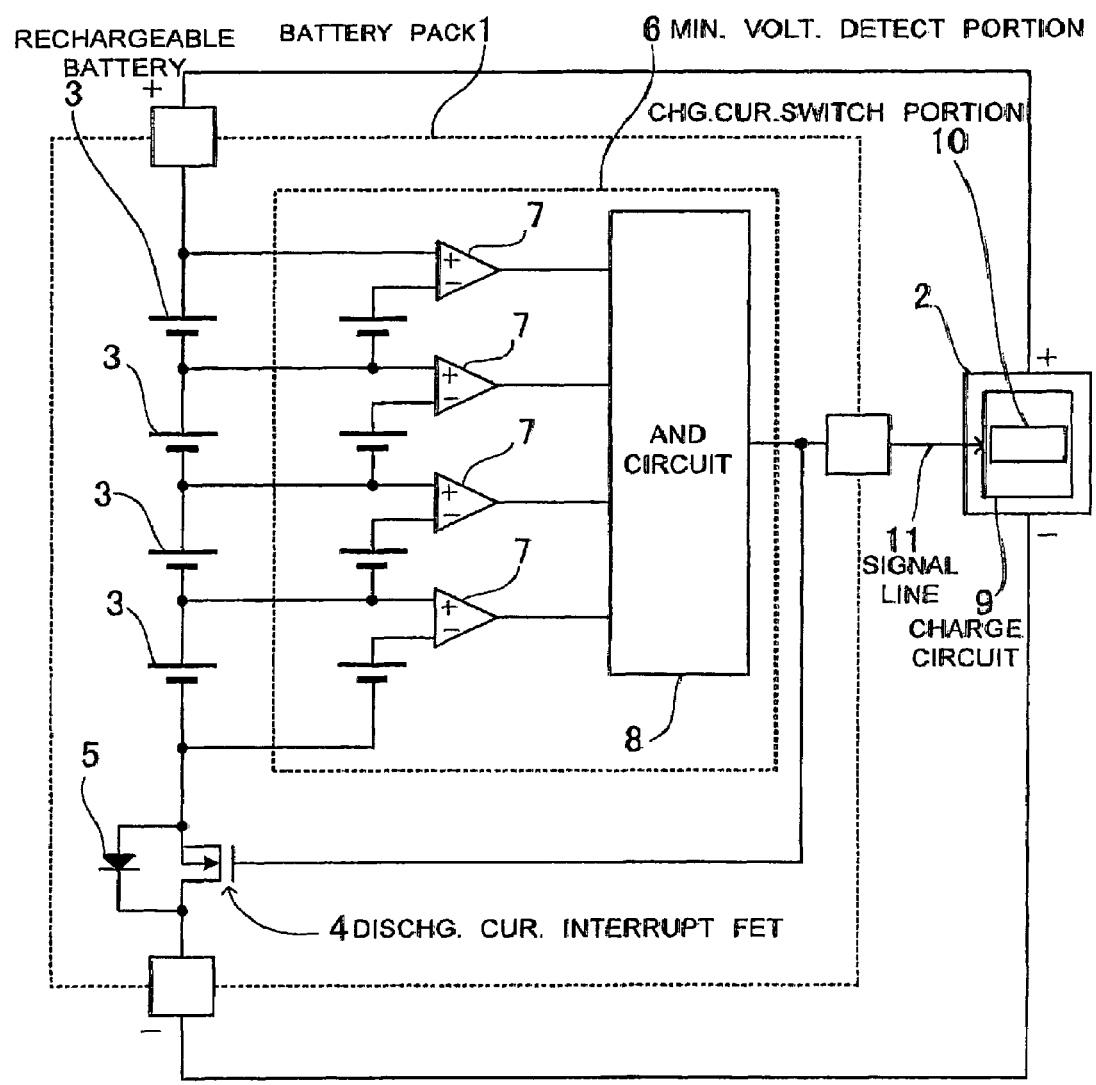
FIG. 2 is a circuit diagram of a power supply apparatus according to one embodiment of the present invention.

A power supply apparatus shown in FIG. 2 has a battery pack 1 and a charger 2 which charges the battery pack 1. The battery pack 1 includes a discharge current interruption FET 4 which is connected to the rechargeable batteries 3 in series and cuts off the discharge current, and a minimum voltage detecting portion 6 which compares each battery voltage with a minimum voltage, and switches the discharge current interruption FET 4 from ON state to OFF state to cut off the discharge current when the voltage of any battery becomes lower than the minimum voltage, as an overdischarge detection portion. The battery pack 1 is detached from the charger 2, and is used as a power supply for electrical equipment (not shown) which is separately prepared.

The rechargeable batteries 3 are lithium-ion batteries connected to each other in series. In the battery pack 1 of the figure, four lithium-ion batteries are connected in series. In the battery pack 1, its output voltage increases as the number of the rechargeable batteries 3 connected in series increases. Accordingly, the voltage of one battery relative to the output voltage decreases. For example, in the battery pack in which two batteries are connected in series, the voltage of one battery comprises 50% of the output voltage. In the battery pack in which four batteries are connected in series, the voltage of one battery comprises 25% of the output voltage. As a result, the probability that the output voltage of the battery pack becomes higher than a prescribed voltage even if the voltage of any battery is lower than the minimum voltage increases as the number of the batteries connected in series increases. The present invention prevents abnormal heat generation in a intrinsic diode 25, (in other ways, the diode 5 is called a parasitic diode 5), in this state. Therefore, the present invention is effective particularly in the battery pack with many batteries connected in series. In the present invention, the battery pack has three or more of, preferably four or more of, and more preferably five or more of batteries connected in series.

A protection circuit, which detects the voltage of each battery and controls overcharge/discharge, is installed in the battery pack, which has lithium-ion batteries as the batteries. Accordingly, the present invention is effective particularly in the battery pack, which has lithium-ion batteries as the batteries. However, the batteries are not limited to lithium-ion and other types of batteries are possible (e.g., that nickel-hydrogen batteries or a nickel-cadmium batteries can be used as the batteries.

The discharge current interruption FET 4 is an FET, which cuts off the discharge current in OFF state and can discharge it in ON state. The discharge current interruption FET 4 can cut off the discharge current, but cannot cut off the charge current. The reason is that the discharge current interruption FET 4 serves as an equivalent circuit in which the parasitic diode 5 is connected in the reverse direction in parallel. The discharge current interruption FET 4 is an FET, for example MOSFET, to which the parasitic diode 5 is connected in parallel in the reverse direction. In the battery pack 1, only the discharge current interruption FET 4, which cuts off the discharge current, is connected to the rechargeable battery 3 in series. However, a charge current interruption FET, which cuts off the charge current, may be connected to the rechargeable battery in series. When any battery rises to a charge prohibition voltage, or the output voltage of battery pack rises to the charge prohibition voltage, the charge current interruption FET turns to OFF state; cutting off the charge current for the battery pack. The charge current interruption FET is also a MOSFET to which the parasitic diode is connected in parallel. Accordingly, a current can be discharged through the parasitic diode in the state where the charge current is cut off when the charge current interruption FET is in OFF state.

The minimum voltage detecting portion 6 has comparators 7 which detect respective voltages of the batteries and compare them with the minimum voltage. An AND circuit 8 provides an OFF signal when an OFF signal is provided from any comparator 7.

In the comparator 7, a reference voltage of voltage value that is equal to the minimum voltage is provided to its input terminal in the negative-side. The voltage of a battery is provided to its input terminal in the positive-side. In each rechargeable battery 3, its negative-side is connected to the negative-side of the reference voltage, and its positive-side is connected to the input terminal of the comparator 7. The comparator 7 provides "High" as an ON signal when the voltage of a battery is higher than the reference voltage, and provides "Low" as the OFF signal when the voltage of a battery becomes lower than the reference voltage.

The AND circuit 8 provides the OFF signal, which brings the discharge current interruption FET 4 to OFF state, to an output terminal when "Low", which is the OFF signal, is provided from any comparator 7. Accordingly, when the voltage of any battery becomes lower than the minimum voltage and the comparator 7 provides the OFF signal, the AND circuit 8 provides the OFF signal, and thus switches the discharge current interruption FET 4 to OFF state. In this state, the discharge current interruption FET 4 cuts off the discharge current, thus, the battery pack 1 cannot discharge a current. The AND circuit 8 provides the ON signal, (which brings the discharge current interruption FET 4 to ON state, only when signals of "High", which are the ON signals) to all input terminals. As a result, in the state where the voltages of all batteries are higher than the minimum voltage and all comparators 7 provide the ON signals, the AND circuit 8 provides the ON signal and switches the discharge current interruption FET 4 to ON state. Thus, the battery pack 1 becomes in the state that can discharge a current.

A charge circuit 9 has a charge current switching portion 10, which controls the charge current based on the output voltage of the battery pack 1. When the battery pack 1 is attached to the charger 2, the charge current switching portion 10 detects the output voltage of the battery pack 1. The charge current switching portion 10 switches the charge current so as to quickly charge the battery pack 1 with a large current in a main charge mode when the output voltage is higher than the prescribed voltage. The charge current switching portion 10 charges the battery pack 1 with a current smaller than in the main charge mode in a preliminary charge mode when it is lower than the prescribed voltage. The charger 2 quickly charges the battery pack 1 in the main charge mode. The charge current for the battery pack 1 in the main charge mode is set to 0.5 C to 4 C, preferably to 0.5 C to 2 C, for example. The charge current in the main charge mode is specified based on the time for fully charging a battery, which fully discharges a current. When the charge current in the main charge mode is set to 1 C, it takes one hour to fully charge the battery, which fully discharges a current. Accordingly, the battery pack 1, which fully discharges a current, can be fully charged in two hours to fifteen minutes, or to thirty minutes, in the case where the charge current in the main charge mode is within the aforementioned range. In consideration of charging an abnormal battery, the charge current in the preliminary charge mode is less than the charge current in the main charge mode. For example, it is set to 0.1 to 0.5 C.

The battery pack 1 and the charge circuit 9 are connected with the signal line 11, which transmits the OFF signal representing OFF state of the discharge current interruption FET 4, from the battery pack 1 to the charger 2. The signal line 11 transmits the OFF signal from the minimum voltage detecting portion 6 of the battery pack 1 to the charge current switching portion 10 of the charger 2. The signal line 11 transmits the OFF signal representing OFF state of the discharge current interruption FET 4 to the charge current switching portion 10 of the battery pack 1.

In the power supply apparatus of FIG. 2, since the minimum voltage detecting portion 6 is connected to the input side of the discharge current interruption FET 4, both the minimum voltage detecting portion 6 and the discharge current interruption FET 4 are connected to the charge current switching portion 10 of the charger 2. Various sorts of a electrical connection are contemplated. It should be understood that the electrical connections are not limited to those illustrated in FIG. 2.

The signal line 11 transmits the OFF signal to the charge current switching portion 10 by connecting the output side of the minimum voltage detecting portion 6 to the charge current switching portion 10 with lead wire as illustrated in FIG. 2, or also can transmit the OFF signal to the charge current switching portion with light by providing a photocoupler or the like at some midpoint of lead wire though not illustrated. When the signal line 11 informs the charge current switching portion 10 of the charger 2, which the discharge current interruption FET 4 of the battery pack 1 is in OFF state, the charge current switching portion 10 of the charger 2 charges the battery pack 1 not in the main charge mode but in the preliminary charge mode; even if the output voltage of the battery pack 1 is higher than the prescribed voltage. That is, the charge current switching portion 10 charges the battery pack 1 in the main charge mode, only when the following two conditions (1) and (2) are satisfied:

(1) The output voltage of the battery pack 1 is higher than the prescribed voltage; and (2) The discharge current interruption FET 4 is not in OFF state. In other words, the discharge current interruption FET 4 is in ON state.

The charge current switching portion 10 of the charger 2 charges the battery pack 1 not in the main charge mode but in the preliminary charge mode when the OFF signal of the discharge current interruption FET 4 is provided through the signal line 11; even if the output voltage of the battery pack 1 is higher than the prescribed voltage. When the battery pack 1 is charged in the preliminary charge mode and the voltages of all battery become higher than the minimum voltage, the discharge current interruption FET 4 is switched from OFF state to ON state. Thus, the signal line 11 stops transmitting the OFF signal from the battery pack 1 to the charger 2. In this state, the charge current switching portion 10 confirms that the output voltage of the battery pack 1 is higher than the prescribed voltage and the discharge current interruption FET 4 is not in OFF state but in ON state, and switches from the preliminary charge mode to the main charge mode and quickly charges the battery pack 1 with a large current.

In the battery pack 1 which is quickly charged in the main charge mode in this state, heat generation of the discharge current interruption FET 4 is small. The reason is that the substantial internal resistance of the discharge current interruption FET 4 in ON state is remarkably small as compared with the internal resistance of the parasitic diode 5. Accordingly, the most part of the large current that quickly charges the battery pack 1 passes through the discharge current interruption FET 4 with small resistance, and the amount of heat generation of the discharge current interruption FET 4 is small. The amount of heat generation of the discharge current interruption FET 4 is proportional to the product of the voltage drop generated at the both ends of the discharge current interruption FET 4 and the current. The voltage drop is proportional to the product of the internal resistance and the current. The voltage drop in the discharge current interruption FET 4 with small internal resistance is small. Therefore, heat generation of the discharge current interruption FET 4 in this state is small, and it is possible to effectively prevent thermal breakdown due to a large charge current in the main charge mode.

Figure 3:
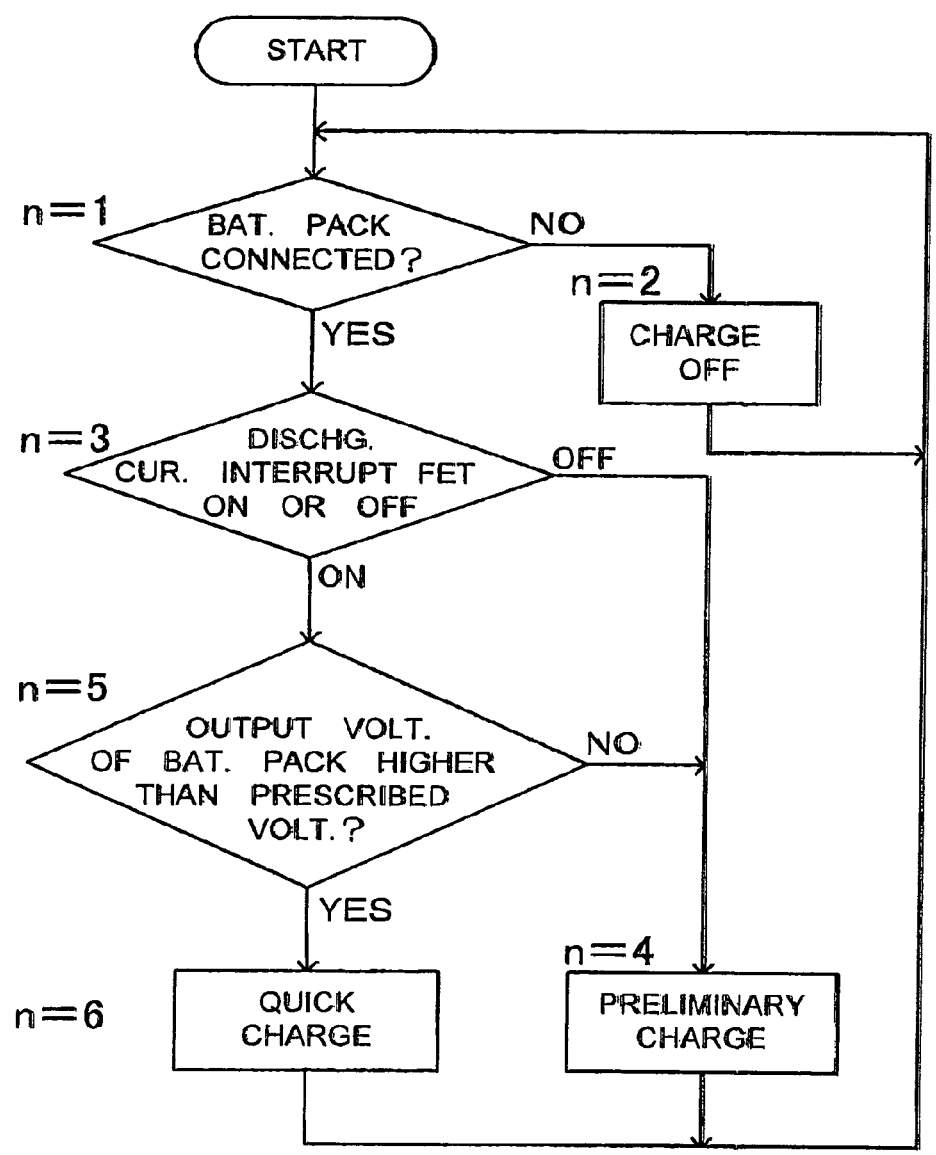
FIG. 3 is a flowchart where the power supply apparatus according to one embodiment of the present invention charges a battery pack.

Although not illustrated, a control circuit, which controls charge of the battery pack, is installed in the charger 2. The control circuit charges the battery pack according to the following steps shown in FIG. 3.

(Step n=1)

The control circuit of the charger 2 detects whether the battery pack 1 is connected. When the battery pack 1 is connected, the procedure goes to the next step. When the battery pack 1 is not connected, charge operation is set to in OFF state, and the procedure loops between steps of n=1 and 2.

(Steps n=3 to 5)

When the battery pack 1 is connected, the control circuit detects whether the discharge current interruption FET 4 is in OFF state or in ON state based on whether OFF state is provided through the signal line 11. When the discharge current interruption FET 4 is the OFF state, the battery pack is charged in the preliminary charge mode in step of n=4. When the discharge current interruption FET 4 is in ON state, the control circuit detects whether the output voltage of the of the battery pack 1 is higher than the prescribed voltage in the following step of n=5. When the output voltage is higher than the prescribed voltage, the battery pack is quickly charged in the main charge mode. When the output voltage is lower than the prescribed voltage, it is charged in the preliminary charge mode. After that, the procedure loops in steps of n=1 to 6, thus, the battery pack 1 is fully charged. In this embodiment, the battery pack is detachable, however, the battery pack and the charger may be integrally formed. In this case, in discharging, the battery pack and the charger are electrically separated, and the discharge output is provided.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

This application is based on application No. 2003-434255 filed in Japan on Dec. 26, 2003, the content of which is incorporated hereinto by reference.

What is claimed is:

1. A power supply apparatus, comprising:
a battery pack including a plurality of rechargeable batteries connected in series; and
a charge circuit charging the battery pack, the battery pack including,
a discharge current interruption FET which is connected to the rechargeable batteries in series and cuts off the discharge current, and
a minimum voltage detecting portion which compares the voltage of each rechargeable battery with a minimum voltage, and switches the discharge current interruption FET from ON state to OFF state to cut off the discharge current when the voltage of any rechargeable battery becomes lower than the minimum voltage, and the charge circuit including,
a charge current switching portion which detects the output voltage of the battery pack, and switches the charge current so as to charge the battery pack in a main charge mode when the output voltage is higher than a prescribed voltage, and to charge the battery pack in a preliminary charge mode with a current smaller than that in the main charge mode when the output voltage is lower than the prescribed voltage,
wherein the battery pack and the charge circuit are connected with a signal line which transmits an OFF signal representing OFF state of the discharge current interruption FET to the charge current switching portion, and the charge current switching portion charges the battery pack in the preliminary charge mode in a state where the voltage of any rechargeable battery becomes lower than the minimum voltage and the OFF signal is provided from the signal line, and even in a state where the output voltage of the battery pack as a whole is higher than the prescribed voltage.

2. The power supply apparatus according to claim 1, wherein the charge current switching portion charges the battery pack in the main charge mode in a state where the output voltage of the battery pack is higher than the prescribed voltage, and in a state where the OFF signal is not provided from the signal line.

3. The power supply apparatus according to claim 1, wherein the charge current in the main charge mode is 0.5 C to 4 C, and the charge current in the preliminary charge is less than the charge current in the main charge mode.

4. The power supply apparatus according to claim 1, wherein the charge current in the main charge mode is 0.5 C to 2 C, and the charge current in the preliminary charge is less than the charge current in the main charge mode.

5. The power supply apparatus according to claim 1, wherein the charge current in the preliminary charge is less than the charge current in the main charge mode, and is 0.1 to 0.5 C.

6. The power supply apparatus according to claim 1, wherein the rechargeable batteries included in battery pack are lithium-ion batteries connected to each other in series.

7. The power supply apparatus according to claim 6, wherein the rechargeable batteries included in battery pack are three or more lithium-ion batteries connected to each other in series.

8. The power supply apparatus according to claim 1, wherein the discharge current interruption FET is a MOSFET.

9. The power supply apparatus according to claim 1, wherein the discharge current interruption FET is connected a charge current interruption FET in series.

10. The power supply apparatus according to claim 1, wherein the minimum voltage detecting portion includes comparators which detect respective voltages of the batteries and compare them with the minimum voltage, and an AND circuit which provides an OFF signal when an OFF signal is provided from any comparator.

11. The power supply apparatus according to claim 1, wherein the battery pack is used for driving a motor of bicycle.

12. The power supply apparatus according to claim 1, wherein the battery pack is used for an electric tool.

13. The power supply apparatus according to claim 1, wherein the signal line is lead wire.

14. The power supply apparatus according to claim 1, wherein the signal line transmits the OFF signal with light by providing a photocoupler at some midpoint of lead wire.

\* \* \* \* \*